United States Patent
Sorrentino et al.

(10) Patent No.: US 11,582,774 B2
(45) Date of Patent: Feb. 14, 2023

(54) CO-CHANNEL CO-EXISTENCE IN A WIRELESS COMMUNICATIONS SYSTEM

(71) Applicant: TELEFONAKTIEBOLAGET LM ERICSSON (PUBL), Stockholm (SE)

(72) Inventors: Stefano Sorrentino, Solna (SE); Erika Tejedor, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 383 days.

(21) Appl. No.: 16/082,246

(22) PCT Filed: Mar. 3, 2017

(86) PCT No.: PCT/IB2017/051260
§ 371 (c)(1),
(2) Date: Sep. 4, 2018

(87) PCT Pub. No.: WO2017/149510
PCT Pub. Date: Sep. 8, 2017

(65) Prior Publication Data
US 2019/0349957 A1     Nov. 14, 2019

Related U.S. Application Data

(60) Provisional application No. 62/303,158, filed on Mar. 3, 2016.

(51) Int. Cl.
*H04W 28/08* (2009.01)
*H04W 72/12* (2023.01)
(Continued)

(52) U.S. Cl.
CPC ....... *H04W 72/1215* (2013.01); *H04L 12/413* (2013.01); *H04L 67/51* (2022.05);
(Continued)

(58) Field of Classification Search
CPC .. Y02D 70/10; H04W 28/0294; H04W 74/04; H04W 74/08; H04W 28/0819;
(Continued)

(56) References Cited

U.S. PATENT DOCUMENTS

| | | | |
|---|---|---|---|
| 2006/0252422 A1* | 11/2006 | Kauffman | B64D 45/0059 455/431 |
| 2014/0113631 A1 | 4/2014 | Zhou et al. | |
| 2015/0249950 A1* | 9/2015 | Teyeb | H04W 48/04 455/437 |

FOREIGN PATENT DOCUMENTS

| WO | 2014064322 A1 | 5/2014 |
|---|---|---|
| WO | WO-2014064322 A1 * | 5/2014 |

OTHER PUBLICATIONS

Campolo, Claudia et al., "Multichannel communications in vehicular Ad Hoc networks: a survey", May 13, 2013, pp. 158-169 (Year: 2013).*

(Continued)

*Primary Examiner* — Salvador E Rivas (57) ABSTRACT

There are provided mechanisms for sharing channels in a wireless communications system among wireless devices that use a plurality of different access technologies. First and second wireless devices are operable to share a channel in the wireless communication system with each other. The first wireless device is operable to provide an indication to the second wireless device that the first wireless device is using a first access technology to access the channel. The second wireless device is operable to receive the indication and determine, based on the indication, that the first wireless device is using a first access technology to access the channel. Accordingly, the second wireless device can determine, based on compatibility of its access technology with (Continued)

that of the first wireless device, whether to refrain from using the channel or to share the channel.

12 Claims, 9 Drawing Sheets

(51) Int. Cl.
*H04W 72/00* (2023.01)
*H04W 74/04* (2009.01)
*H04L 67/51* (2022.01)
*H04W 74/08* (2009.01)
*H04L 12/413* (2006.01)
*H04W 4/70* (2018.01)
*H04W 48/02* (2009.01)

(52) U.S. Cl.
CPC ..... *H04W 28/0819* (2020.05); *H04W 72/005* (2013.01); *H04W 72/1247* (2013.01); *H04W 74/04* (2013.01); *H04W 74/0808* (2013.01); *H04W 4/70* (2018.02); *H04W 48/02* (2013.01)

(58) Field of Classification Search
CPC ............. H04W 48/02; H04W 74/0808; H04W 52/0203; H04L 12/413
See application file for complete search history.

(56) References Cited

OTHER PUBLICATIONS

Etsi, "TS 102 792 v.1.2.1", Jun. 2015, pp. 1-23 (Year: 2015).*
Campolo, Claudia et al.,"Multichannel communications in vehicular Ad Hoc networks: a survey," IEEE Communications Magazine, pp. 158-169, vol. 5, No. 51, IEEE Service Center, Piscataway, United States, May 13, 2013.
Ericsson et al., "Comments on Doc192," ETSI Draft; BRAN( 16)000017, European Telecommunications Standards Institute, Jan. 25, 2016, pp. 1-9. <docbox.etsi.org\BRAN\BRAN\05-CONTRIBUTIONS\2016\BRAN(16)000017 Comments on Doc192\BRAN(15)000192 Co-existence and-Mitigation Techniques TR-103 319 commented.doc>.

* cited by examiner

PRIOR ART

CO-CHANNEL CO-EXISTENCE IN A WIRELESS COMMUNICATIONS SYSTEM

This application is a 371 of International Application No. PCT/IB2017/051260, filed Mar. 3, 2017, the disclosure of which is fully incorporated herein by reference.

TECHNICAL FIELD

The disclosed subject matter relates generally to telecommunications and more particularly to certain approaches for co-channel co-existence for primary and secondary services and technologies.

BACKGROUND

During Release 12, the LTE standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application is direct communication based on physical channels terminated directly between devices.

Figure 1:
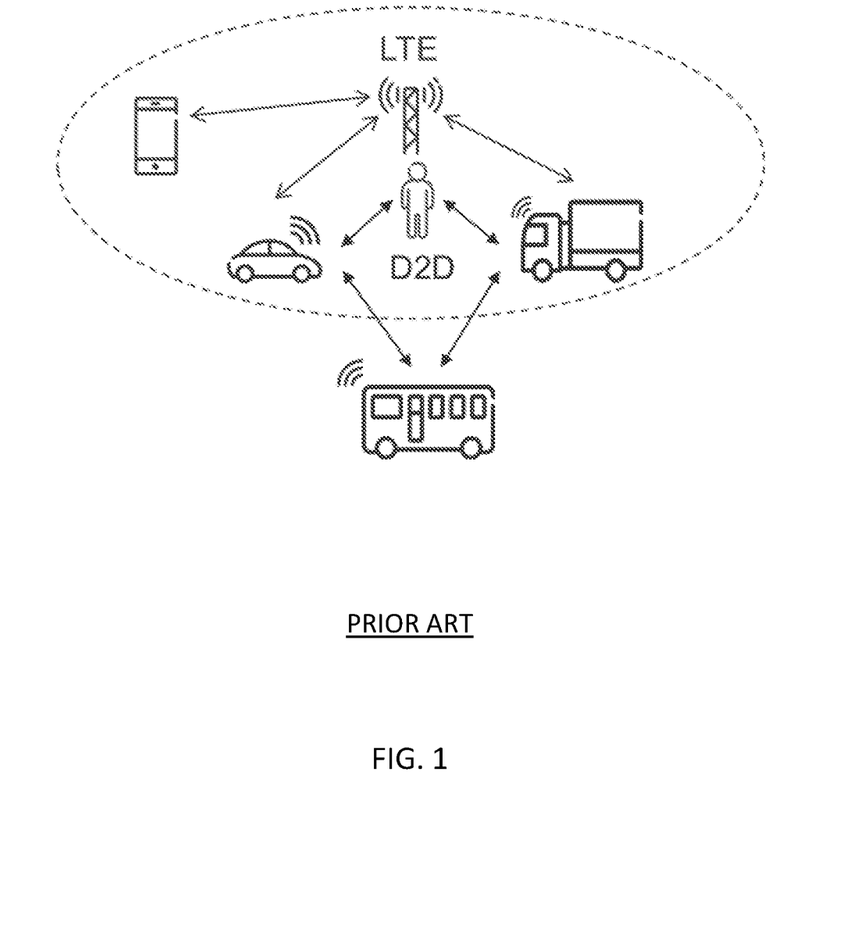
FIG. 1 illustrates a wireless communications network capable of supporting vehicle-to-x (V2x) communications.

As illustrated in FIG. 1, one potential extension for the device-to-device work is support of vehicle-to-x (V2x) communication, which includes any combination of direct communication between vehicles, pedestrians, and infrastructure. V2x communication may take advantage of a NW infrastructure, when available, but at least basic V2x connectivity should be possible even in case of lack of coverage. Providing an LTE-based V2x interface may be economically advantageous because of the LTE economies of scale and it may enable tighter integration between communications with the network infrastructure (vehicle-to-infrastructure) and communications with pedestrians (V2P) and other vehicles (V2V), as compared to using a dedicated V2x technology.

V2x communications may carry both non-safety and safety information, where each of the applications and services may be associated with sets of specific requirements, e.g., in terms of latency, reliability, capacity, etc.

ETSI has defined two types of messages for road safety: Co-operative Awareness Message (CAM) and Decentralized Environmental Notification Message (DENM). A CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for pre-crash sensing warning is 50 ms. A DENM message is event-triggered, such as by braking, and the availability of a DENM message is also checked for every 100 ms. Moreover, the requirement of maximum latency is <=100 ms. The package size of CAM and DENM message varies from 100+ to 800+ bytes and the typical size is around 300 bytes. The message is designed to be detected by all vehicles in a proximity range.

The Society of the Automotive Engineers (SAE) has also defined the Basic Safety Message (BSM) for DSRC with various messages sizes defined. According to the importance and/or urgency of the messages, the BSMs are further classified into different priorities.

Figure 2:
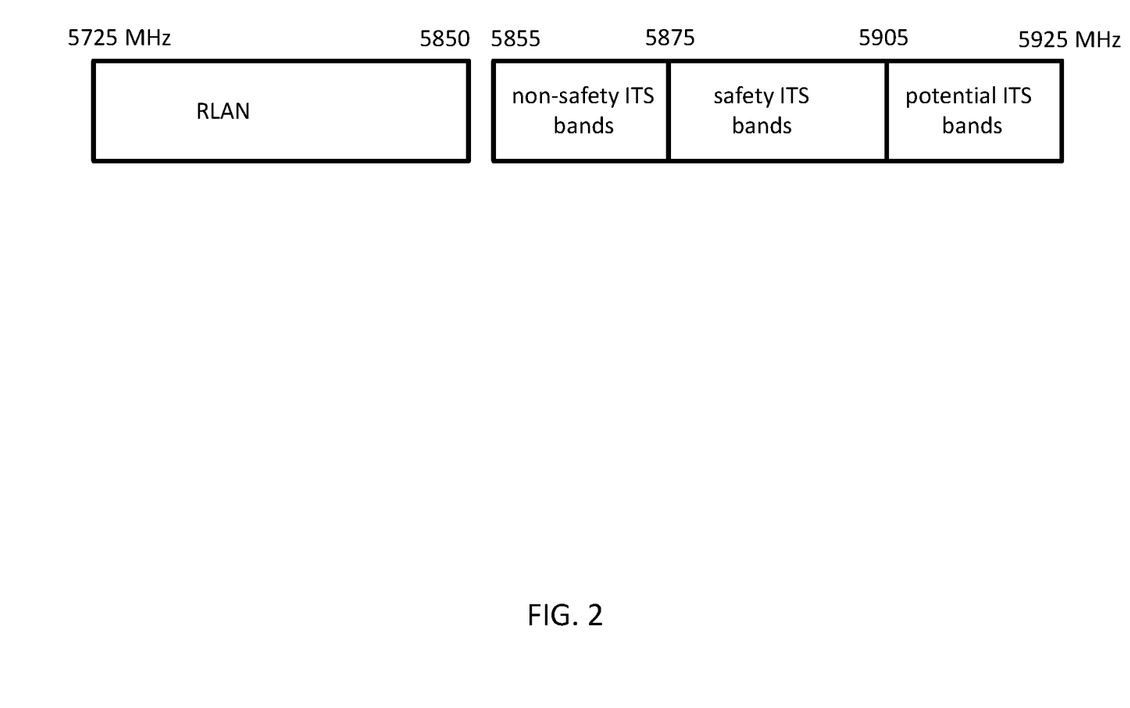
FIG. 2 illustrates a portion of electromagnetic spectrum designated in Europe for intelligent transport systems (ITS) communications.

In Europe, 7×10 MHz channels (also referred to herein as bands) are currently designated for intelligent transport systems (ITS) safety-related services in the 5875-5905 MHz band, as shown in FIG. 2. In addition, 5905-5925 MHz is identified as a potential extension band for ITS and 5855-5875 MHz is recommended to be made available for ITS non-safety related applications. ITS services are expected to be primary services deployed on such spectrum. Any other system or service that wishes allocation as a secondary service may be required to ensure that it gives priority to ITS services. On the other hand, non-safety ITS services are not of the same priority and could potentially be co-primary allocated with other services.

Telecommunication regulators consider issues related to wireless access systems, including radio local area networks (WAS/RLAN) in the frequency bands between 5,150 MHz and 5,925 MHz, and take appropriate regulatory actions, including additional spectrum allocations to mobile services. The Electronic Communications Committee (ECC) has mandated the European Conference of Postal and Telecommunications Administrations (CEPT) to do such compatibility studies for ITS services.

Currently, the ETSI ITS standards consider Dedicated Short Range Communications (DSRC) technologies as a baseline for ITS. At the same time, a new Work Item (WI) has been approved in 3GPP to define LTE for ITS (both safety and non-safety). Both access technologies are then of the same priority and will need to co-exist in the same spectrum.

Listen-Before-Talk (LBT) is another access technology defined in ETSI ITS, EN 302 571. Listen-Before-Talk requires the device which wishes to transmit to listen the channel and transmit if the measured level in such channel is below a pre-defined threshold. However, this does not ensure that the detected signal is the one.

Listen-Before-Talk in conjunction with preamble detection requires the device which wishes to transmit to listen the channel and transmit if the measured level in such channel is below a pre-defined threshold.

In addition, ETSI TR 103 319 proposes the use of Preamble detection to allow radio local area network (RLAN) devices to detect dedicated short range communications (DSRC).

SUMMARY

An object of embodiments herein is to facilitate effective channel sharing between two different access technologies in a wireless communications network.

According to a first aspect, there is presented a method for sharing a channel in a wireless communications system that uses a plurality of different access technologies or schemes. The method includes a wireless device accessing the channel, determining that an access technology used to access the channel is a first one of the plurality of different access technologies, and at least partially in response to the determination, indicating to one or more other wireless devices that the first access technology is used to access the channel.

In an embodiment according to the first aspect, the use of the first access technology is indicated to the one or more other wireless devices using a service advertisement signal that is broadcast to advertise use of the channel to the one or more other wireless devices. The service advertisement signal may be broadcast periodically. Moreover, the use of the first access technology may be indicated to the one or more other wireless devices by at least one predetermined signal parameter of the service advertisement signal, the at least one predetermined signal parameter being recognizable by the one or more other wireless devices as indicating use of the first access technology. Further, the at least one predetermined signal parameter may be at least one of a periodicity of the service advertisement signal, and a predetermined sequence used to generate the service advertisement signal.

In any of the foregoing embodiments according to the first aspect, the channel is accessed by the wireless devices for one or more Intelligent Transport Systems (ITS) services.

In any of the foregoing embodiments according to the first aspect, the plurality of different access technologies includes IEEE-based and 3GPP-based technologies.

In any of the foregoing embodiments according to the first aspect, certain services for which the channel is accessed are designated as primary services to be prioritized over certain other services in the network. Moreover, the method further includes determining that a service for which the channel is accessed is designated as a primary service and indicating that the service is designated as a primary service to the one or more other wireless devices.

According to a second aspect, there is presented a method for sharing a channel in a wireless communications system among wireless devices that use different access technologies. The method includes monitoring, at a first wireless device, a channel for an indication that the channel is accessed by a second wireless device. The method further includes receiving the indication that the channel is accessed by a second wireless device and determining, based on the indication, that the second wireless device is using a first access technology to access the channel.

In an embodiment according to the second aspect, a service advertisement signal provides the indication that the channel is accessed by a second wireless device, the service advertisement signal being broadcast to advertise use of the channel to at least the first wireless device. Moreover, at least one predetermined signal parameter of the service advertisement signal indicates to the first wireless device that the second wireless device is using the first access technology.

In any of the foregoing embodiments according to the second aspect, the first wireless device may use a second access technology to attempt to access the channel, in which case the method further includes at least partially in response to the determination that the second wireless device is using the first access technology, refraining from using the channel. Furthermore, the first wireless device may then monitor another channel for an indication that the another channel is accessed by a third wireless device, receive the indication that the another channel is accessed by the third wireless device and determine, based on the indication, that the third wireless device is using the second access technology to access the another channel. At least partially in response to the determination that the third wireless device is using the second access technology, the first wireless device may share the another channel with the third wireless device.

Alternatively, instead of refraining from using the channel, the first wireless device may, at least partially in response to the determination that the second wireless device is using the first access technology, signal to the second wireless device an instruction to refrain from using the channel to facilitate use of the channel by the first wireless device.

In another embodiment according to the second aspect, certain services for which the channel is accessed are designated as primary services to be prioritized over other certain services in the network. Moreover, when the first device is attempting to use the channel for a non-primary service, the method includes further determining, based on the indication that the channel is accessed by a second wireless device, that the second wireless device is using the channel for a service that is designated as a primary service. At least partially in response to the determination that the second wireless device is using the channel for a primary service, the first wireless device refrains from using the channel.

Alternatively, when the first wireless device is attempting to use the channel for a primary service and is using a second access technology to attempt to access the channel, the method includes further determining, based on the indication that the channel is accessed by a second wireless device, that the second wireless device is using the channel for a service that is designated as a primary service. At least partially in response to the determination that the second wireless device is using the channel for a primary service, the first wireless device refrains from using the channel.

According to a third aspect, there is presented a wireless device operable to share a channel in a wireless communications system with one or more other wireless devices that use a plurality of different access technologies, the wireless device operable to perform embodiments of the method according to the first aspect.

According to a fourth aspect, there is presented a wireless device operable to share a channel in a wireless communications system with one or more other wireless devices that use a plurality of different access technologies, the wireless device operable to perform embodiments of the method according to the second aspect.

According to a fifth aspect, there is presented a wireless communication system that includes first and second wireless devices, each operable to share a channel in the wireless communication system. The first wireless device is operable to provide an indication to the second wireless device that the first wireless device is using a first access technology to access the channel. Moreover, the second wireless device is operable to receive the indication and determine, based on the indication, that the first wireless device is using the first access technology to access the channel.

According to a sixth aspect, there is presented a computer program for sharing a channel in a wireless communications system among wireless devices that use a plurality of different access technologies, the computer program comprising computer code which, when run on processing circuitry of a wireless device, causes the wireless device to perform embodiments of the method according to the first aspect.

According to a seventh aspect, there is presented a computer program for sharing a channel in a wireless communications system among wireless devices that use a plurality of different access technologies, the computer program comprising computer code which, when run on processing circuitry of a wireless device, causes the wireless device to perform embodiments of the method according to the second aspect.

Advantageously the disclosed methods, wireless communication devices, and computer programs allow for wireless communication devices using different access technologies that would otherwise be incompatible to share a channel, i.e., co-exist, in a wireless communications system. In certain embodiments, the disclosed methods, wireless communication devices, and computer programs facilitate channel sharing while allowing certain services to be prioritized over others.

It is to be noted that any feature of the first through seventh aspects may be applied to any other aspect, wherever appropriate. Likewise, any advantage of the first aspect may equally apply to the second through seventh aspects, respectively, and vice versa. Other objectives, features and advantages of the enclosed embodiments will be apparent from the following detailed disclosure, from the attached dependent claims as well as from the drawings. The steps of any method disclosed herein do not have to be performed in the exact order disclosed, unless explicitly stated.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Conventional channel access solutions fail to adequately provide fair use of the channel between different access technologies and particularly for ITS access technologies. (As used herein an "access technology" refers to radio access protocols or schemes used by radio nodes when communicating with each other. Access technologies may include, e.g., IEEE-based schemes, (including IEEE 802.p, IEEE 802.11ac, etc.) and 3GPP-based schemes (including 3GPP LTE-ITS, 3GPP LAA, 3GPP LTE, 3GPP LTE-U, 3GPP NR, etc.), among others. For example, the IEEE 802.11p access scheme is based on very short sensing periods and fast channel access while an LTE-ITS access scheme has a slotted and much slower scheduling protocol which on the other hand enables higher resource efficiency. Channel sharing would not be fair towards 3GPP-based ITS since the use of the channel would be impeded for 3GPP-based ITS and should be avoided. (As used herein a "service" refers to an application running at the network application layer and above that provides, e.g., data storage, manipulation, presentation, communication, or other capability for one or more wireless devices in a wireless communication network and is often implemented in a client-server or peer-to-peer architecture.) Accordingly, in consideration of these and other shortcomings of existing technologies, certain embodiments of the disclosed subject matter facilitate co-channel access for wireless devices that use different access technologies. For example, in one embodiment a wireless device accessing a channel with a first access technology may indicate to other wireless devices that the first access technology is being used to access the channel. Accordingly, other wireless devices can determine whether to avoid use of the channel (if the access technologies differ and would result in use of the channel being impeded for one technology), or to share the channel (if the access technologies are the same). Moreover, the determination of whether to share or avoid use of the channel may, in certain embodiments, depend on a priority level of the service for which the channel is used, independently of access technology used for the service. For example, a primary service may take precedence or priority (e.g., served with a higher quality of service level) over a secondary, i.e., non-primary, service. A service that provides or handles safety related data or network traffic, for example, may be designated as a primary service.

The described embodiments may provide various potential benefits compared to conventional approaches. For instance, certain embodiments may ensure that a channel in use by a primary service will not be used by non-primary services, thereby enhancing reliability of the primary service. Similarly, certain embodiments may ensure that a detected service using the channel is a primary service before transmitting on the channel.

In a conventional coexistence framework (e.g., coexistence between IEEE WiFi and 3GPP-based ITS) coexistence is achieved within a certain channel (i.e., a band, subband, carrier, etc.). The different technologies aim at TDM access of the channel by sensing the channel for predefined periods and accessing the channels opportunistically as soon as the channel is sensed "free" for a sufficient amount of time, and under certain additional rules. Such framework is only efficient if the access technologies use similar protocols for accessing the channel, in such a way that they would have similar chances to transmit in case of a short transmission opportunity. This is however not the case for, e.g. 3GPP-based ITS and IEEE standards for ITS such as 802.11p. While 802.11p has an opportunistic access scheme based on very short sensing periods and fast channel access, 3GPP-based ITS has a slotted and much slower scheduling protocol which on the other hand enables higher resource efficiency. In other words, co-channel access between 3GPP-based ITS and 802.11p would not be fair towards 3GPP-based-ITS and should be avoided.

Based on the above observations regarding different access technologies a coexistence framework may be defined that aims at dynamic splitting of channels between access technologies rather than at dynamic coexistence within a single carrier. Such a framework is particularly suitable for the ITS case where multiple channels are defined.

Certain embodiments described herein distinguish between primary and secondary wireless devices, although additional subcategories are not precluded. A primary wireless device is a wireless device participating in one or more primary service on a given channel. A secondary (or non-primary) wireless device is a wireless device participating in one or more secondary services on a given channel. The access technology used to access a channel for a service may be independent of the type of service. Thus, wireless devices can make use of both primary and secondary services using different access technologies.

An example of a primary service is an ITS safety-related service. The channel may be in a band designated for ITS services (e.g., one of the channels in the 5850-5925 MHz band). A secondary service may be, for example, a non-safety ITS service or non-ITS service. These are just some examples and the same framework may be applied to any kind of services.

The various alternative embodiments described herein, which may be combined in certain ways as will be appreciated by those skilled in the art, may potentially facilitate enabling detection of individual access technologies associated with specific primary wireless devices, defining behavior of co-primary wireless devices in order to enable them to efficiently coexist on shared bands, and/or defining behavior of secondary wireless devices in order to enable them to efficiently coexist with primary wireless devices on shared bands.

In certain embodiments, primary wireless devices transmit signals, which may be service advertisement signals, to indicate to other wireless devices that they are accessing a certain carrier. The service advertisement signals may be periodic and may also be used for other purpose, e.g., they could be synchronization signals.

In one example the service advertisement signals are pre-defined according to an industry-recognized standard specification. The service advertisement signals may be specific for a certain access technology (e.g., 3GPP-basedITS). The signals may also, or alternatively, be differentiated for different levels of priority and/or type of service. For example, different service advertisement signals can be used by wireless devices respectively providing ITS safety services (primary service) and ITS non-safety services (lower priority than safety services). The service advertisement signals may be differentiated in various ways, e.g., by use of specific sequences and/or specific resource mappings or any other transmission property/characteristic that would enable a receiver to discriminate between different service advertisement signals. In one embodiment, a specific sequence (associated to a Zadoff-Chu root sequence or a pseudo-number generator initialization) or set of sequences is used to indicate a specific service advertisement.

A "periodic" service advertisement signal may be periodic in that it is transmitted with a certain time regularity and not e.g., as part of a data transmission. It is understood that rules may be defined such that a wireless device that has not actively transmitted data for a certain time may suspend transmission of the periodic service advertisement signals. Other conditions may apply for suspension of the transmission of service advertisement signals. For example, if service advertisement signals for the same service and same technology are already detected within an area, some wireless devices may skip transmission of such signals since they would be redundant. The regularity of the transmission is beneficial at least because it facilitates reserving a carrier or subband for a certain type of access technology and spectrum in a semi-static way as described in more detail further below.

In certain embodiments, the backoff and channel selection behavior of a wireless device may be at least partially defined per the decision logic set forth in Table 1 below. Table 1 below is applicable to a context in which a first device (denoted "device 1") is deciding whether to use a channel and a second device ("device 2") is using or accessing the same channel. Each of the devices may use one of two different access technologies in the example shown. Device 2 provides an indication to other wireless devices, e.g., in the form of a service advertisement signal broadcast on the channel, that indicates to other wireless devices which access technology it is using. To decide whether to use the same channel, device 1 monitors the channel for the indication that device 2 is using the particular access technology to transmit on the channel. Based on the received indication, device 1 is able to determine which access technology device 2 is using to access the channel.

Once device 1 has determined which access technology device 2 is using, device 1 decides whether to use the channel or refrain from using it. According to the decision table, if the devices are both using the same access technology, device 1 decides to use the channel. If they are using different access technologies, on the other hand, device 1 decides to back off, i.e., refrain from using the channel, and search for another channel.

TABLE 1

First backoff/channel selection decision table

|  |  | Access Technology used by device 1 | |
| --- | --- | --- | --- |
|  |  | Technology 1 | Technology 2 |
| Access Technology used by device 2 | Technology 1 | Device 1 uses channel | Device 1 backs off |
|  | Technology 2 | Device 1 backs off | Device 1 uses channel |

According to another embodiment, represented by the backoff and channel selection decision behavior of Table 2 below, device 1 takes into account not only which access technologies are used by the devices but also a priority level of service for each device. As with Table 1, Table 2 is applicable to a context in which device 2 is using or accessing a shared channel and device 1 is deciding whether to use the same channel. Moreover, as discussed further above, certain services for which a shared channel is accessed are designated as primary services to be prioritized over other certain services (referred to herein as "secondary" or "non-primary" services) in the network. Thus, if device 2 is using the channel for a primary service and device 1 is seeking to use the channel for a secondary service, device 1 will decide to refrain from using the channel independent of whether the devices are using the same access technologies or not. Device 1 also decides to refrain from using the channel if it is seeking to use the channel for a primary service, but device 2 is also using the channel for a primary service and is using a different access technology than device 1. Accordingly, the devices will avoid a situation in which both are using the channel for a primary service but one is unable to use the channel effectively due to a lack of transmission opportunities incurred by the other device's use of a different access technology.

The service advertisement signal can be used to apprise device 1 of whether device 2 is using a primary service, in addition to whether device 2 is using a different access technology. For example, there may be a variety of signal parameters of the service advertisement signal that may be varied to communicate which access technology and which type of service device 2 is using.

TABLE 2

Second backoff/channel selection decision table

|  |  | Access Technology and service used by device 1 | | | |
| --- | --- | --- | --- | --- | --- |
|  |  | Technology 1 PRIMARY | Technology 1 SECONDARY | Technology 2 PRIMARY | Technology 2 SECONDARY |
| Access Technology and service used by device 2 | Technology 1 PRIMARY | Device 1 uses channel | Device 1 backs off | Device 1 backs off | Device 1 backs off |
|  | Technology 1 SECONDARY | Device 1 uses channel | Device 1 uses channel | Device 1 uses channel | Device 1 uses channel |
|  | Technology 2 PRIMARY | Device 1 backs off | Device 1 backs off | Device 1 uses channel | Device 1 backs off |
|  | Technology 2 SECONDARY | Device 1 uses channel | Device 1 uses channel | Device 1 uses channel | Device 1 uses channel |

Whether Table 1 or Table 2 is applicable, in certain embodiments, upon reaching the decision to back off from using the channel, device 1 may also begin monitoring the channel again after a certain period of time, T1. Alternatively, when device 1 backs off it may begin monitoring a different channel and apply the same procedure as discussed above. In one embodiment, an order of channels to monitor may be predefined such that device 1 uses certain channels for a given access technology and/or priority level of service unless another device or devices are already using the channel with a different access technology. Alternatively, the order of channel monitoring may be at least partially randomized. If, on the other hand, device 1 begins using the same channel as device 2, device 1 may also continue the monitoring operation in the background or may repeat the monitoring operation after a certain period of time T2, where the period of time T2 may be the same as or, in certain embodiments, may differ from the period of time T1. Moreover, if device 1 is using a secondary service and, while monitoring in the background, detects a service advertisement signal for a primary service, device 1 may, in one embodiment, suspend transmission to facilitate use of the channel for the primary service.

For ease of illustration, two types of access technologies are discussed in the foregoing examples and only one device (device 2) is assumed to be using the channel. However, each of devices 1 and 2 may be adapted to use one of a three or more different types of access technologies to access the channel. Moreover, a situation may occur where additional devices are using the channel when device 1 is making channel selection decisions. If more than two access technologies are being used and/or more than a single device is already sharing the channel, similar decision logic may be gainfully applied. For example, in embodiments corresponding to Table 1 where more than one device is already using the channel and/or use of more than two access technologies is possible, device 1 backs off if any of the other devices' access technologies differ from that of device 1 and decides to use the channel otherwise. Furthermore, in the embodiments corresponding to Table 2, device 1 backs off if: 1) any of the other devices' access technologies differ from that of device 1 and such device or devices are using a primary service or 2) if device 1 is attempting to use a secondary service and any of the other devices' is using a primary service, regardless of access technology. If neither of these conditions is met, however, device 1 decides to use the channel.

Moreover, in one embodiment the service advertisement signal may be broadcast by a radio node other than device 2. For example, the service advertisement signal may be broadcast by a network node that is serving device 2. In a further embodiment corresponding to the embodiment of Table 1, instead of refraining from using the channel when the access technologies differ, device 1 may signal to device 2 an instruction to refrain from using the shared channel to facilitate its use of the channel, particularly when device 1 is using a higher priority service than device 2.

Device 1 may also use additional criteria when deciding whether to access a channel. For example, in one embodiment device 1 takes into account load balancing across channels. If device 1 determines that a channel is suitable for transmission according to the foregoing embodiments, but a congestion condition is detected on the channel, device 1 tries to find another channel for transmission. Congestion may be detected in different ways, including, e.g., detection of a high interference level, long latency for accessing the channel, etc.

Figure 3:
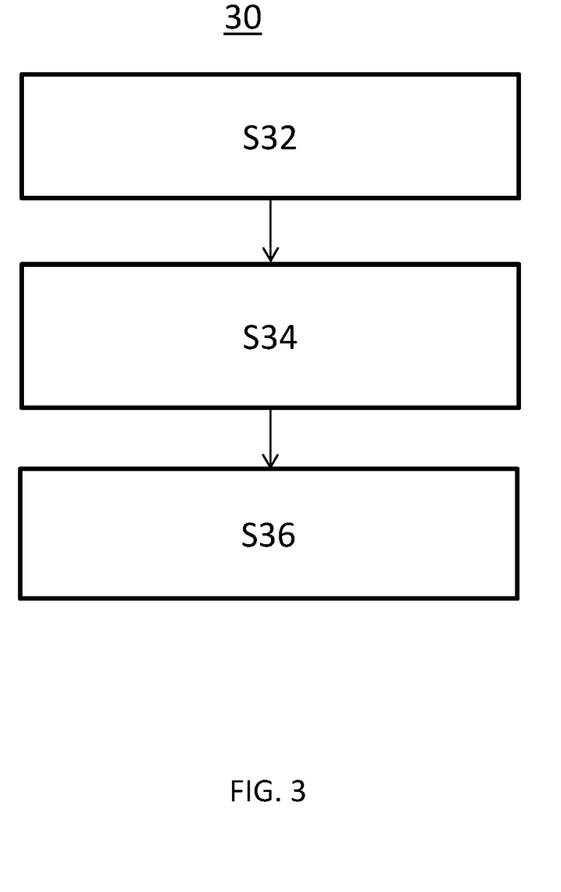
FIG. 3 is a flowchart of a method for a wireless device that indicates use of a particular access technology according to embodiments.

FIG. 3 illustrates a flowchart of a method 30 for operating a wireless device in a wireless communications network to facilitate sharing a channel in the network. The wireless device implementing method 30 is using a channel for a service and indicates to one or more other wireless devices its use of a particular access technology on the channel. In step S32 of method 30, a wireless device tries to access a channel. The channel may be accessed to make use of or participate in a service. In one embodiment the service is a primary service. In step S34, the wireless device determines that an access technology used to access the channel is a first one of the plurality of different access technologies. In step S36, the wireless device, at least partially in response to the determination, indicates to one or more other wireless devices that the first access technology is used to access the channel. The indication may be provided, e.g., using a service advertisement signal transmitted from the wireless device or from a radio node serving the wireless device to advertise to other wireless devices that the channel is being used. The service advertisement signal may be broadcast periodically. In addition, at least one predetermined signal parameter of the service advertisement signal may be used to indicate use of the first access technology to the one or more other wireless devices. The one or more other wireless devices may be configured to recognize the at least one predetermined signal parameter as indicating use of the first access technology. Furthermore, if the wireless device is using the channel for a primary service, the wireless device may be configured to indicate that the service is designated as a primary service using, e.g., the service advertisement signal.

Figure 4:
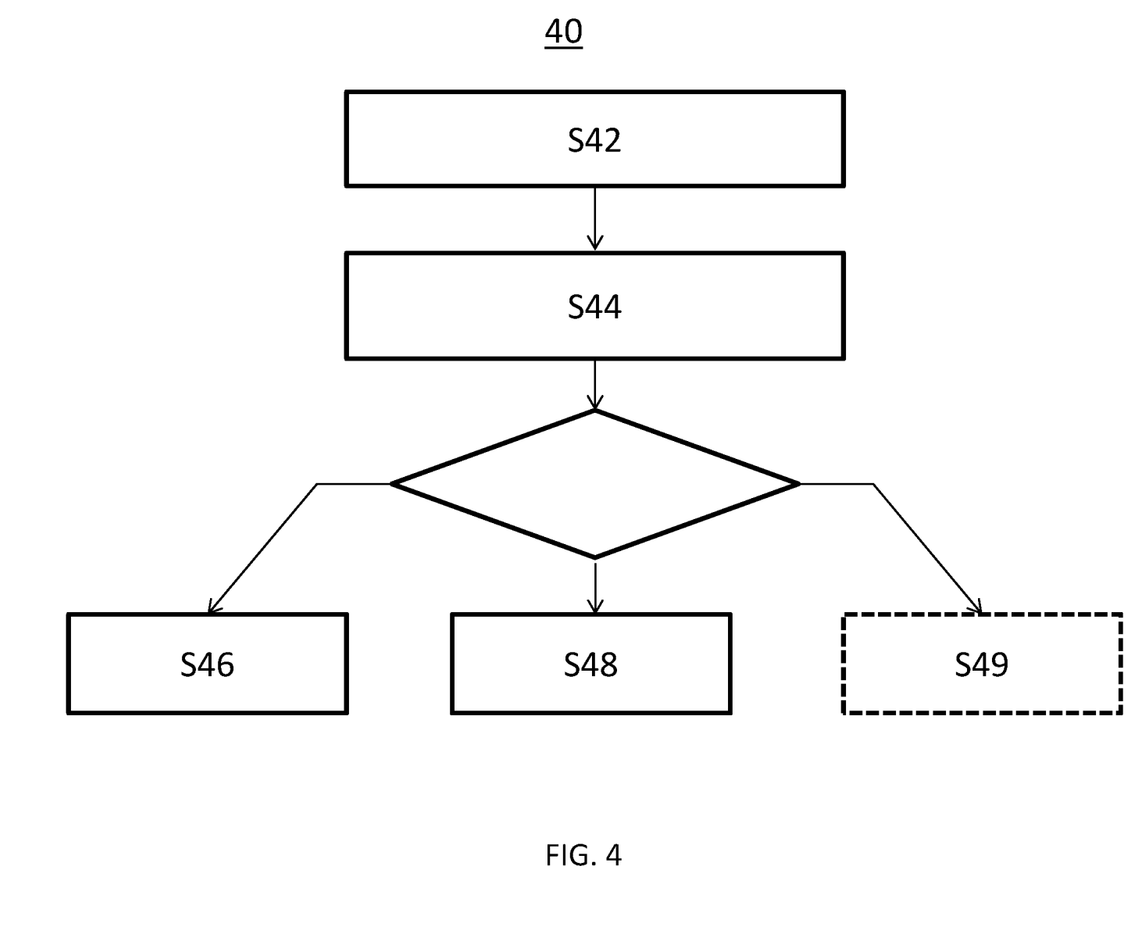
FIG. 4 is a flowchart of a method for a wireless device that receives an indication of another wireless device's use of a particular access technology according to embodiments.

FIG. 4 illustrates a flowchart of a method 40 for operating a first wireless device in a wireless communications network to facilitate sharing a channel in the network. The first wireless device implementing method 40 monitors a channel for and, at certain times, receives an indication of a second wireless device's use of a particular access technology on the channel. In step S42 of method 40, the first wireless device is seeking to use the channel and initially monitors the channel for an indication that the channel is accessed by one or more other wireless devices. In step S44, the first wireless device receives an indication that the channel is accessed by a second wireless device and, based on the indication, determines that the second wireless device is using a first access technology to access the channel. For example, a service advertisement signal that is broadcast to advertise use of the channel to at least the first wireless device may provide the indication that the channel is accessed by the second wireless device. Moreover, at least one predetermined signal parameter of the service advertisement signal may indicate to the wireless device that the second wireless device is using the first access technology. The first wireless device may consider additional conditions and/or inputs to determine whether to refrain from using the channel (step S46) or share the channel (step S48). In certain embodiments, another possible option is for the first wireless device to instruct the second wireless device to refrain from using the channel (step S49).

A decision to refrain from using the channel (step S46) may be reached by the first wireless device under the following conditions (which may be determined at step S44): 1) the determination that the second wireless device is using the first access technology, and 2) a determination that the first wireless device is using a second access technology to attempt to access the channel, where the second access technology is substantially incompatible with the first access technology in terms of channel sharing. Alternatively, in such a situation the first wireless device may instruct the second wireless device to refrain from using the channel, at step S430, to facilitate the first wireless device's use of the channel.

The first wireless device may reach the decision to refrain from using the channel in step S46 based on various other conditions being met, as well. For example, in one embodiment the first wireless device is attempting to use the channel for a non-primary service and determines, based on the indication of the channel being accessed by the second wireless device (at step S44), that the second wireless device is using the channel for a service that is designated as a primary service. The first wireless device determines such conditions (at step S44) and when such conditions are met the first wireless device decides to refrain from using the channel at step S46, regardless of whether the first wireless device is using the same or a different access technology than the second wireless device.

In another embodiment, the first wireless device is attempting to use the channel for a primary service and is using a second access technology to attempt to access the channel. Under such conditions, the first wireless device may determine, based on the indication that the channel is accessed by the second wireless device (at step S44), that the second wireless device is using the channel for a service that is designated as a primary service. Under such conditions, the wireless device may defer to the second wireless device's use of the channel for the primary service (i.e., refrain at step S46) or, because it is also using a primary service, the first wireless device may instruct the second wireless device to refrain from using the channel (at step S49) to facilitate the first wireless device's use of the channel.

When, however, the first wireless device determines that the second wireless device uses the same access technology as the first wireless device, based on the received indication, the first wireless device may proceed to transmit on the channel, i.e., share the channel, at step S48, unless the first wireless device is using a secondary service and the second wireless device is determined to be using a primary service. Moreover, the first wireless device may decide to share the channel (step S48) when the second wireless device is determined to be using the channel for a secondary service. When the first wireless device is using a primary service and the second wireless device is using the channel for a secondary service, the second wireless device may be configured to receive an indication that the first wireless device is using the channel for a primary service and refrain from using the channel to facilitate the first wireless device's use of the channel.

The methods 30 and 40 are provided by way of example for illustration purposes. Other embodiments are contemplated in which certain steps are added, omitted, and/or arranged in a different order. For example, after step S46 of method 40, the first wireless device may repeat the method 40 with respect to another channel. Moreover, additional conditions considered than those mentioned above, such as congestion on a channel.

The described embodiments may be implemented in any appropriate type of communication system supporting any suitable communication standards and using any suitable components. As one example, certain embodiments may be implemented in a communication system including a wireless communications network such as that illustrated in FIG. 5. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 5:
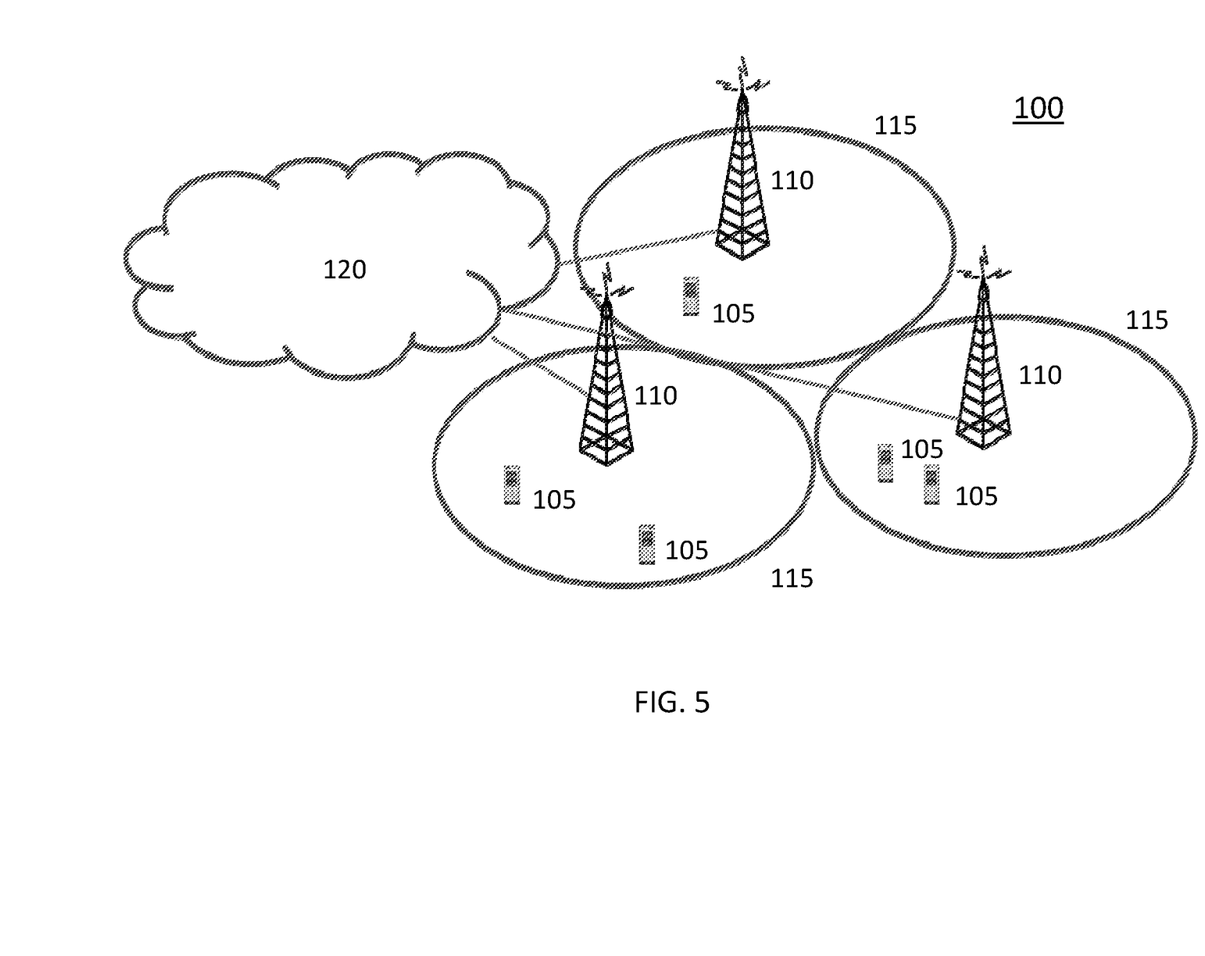
FIG. 5 illustrates communication system according to an embodiment of the disclosed subject matter.

Referring to FIG. 5, a communication system 100 comprises a plurality of wireless communication devices 105 (e.g., UEs, machine type communication [MTC]/machine-to-machine [M2M] UEs, ITS devices) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone). Although wireless communication devices 105 may represent communication devices that include any suitable combination of hardware and/or software, these wireless communication devices may, in certain embodiments, represent devices such as those illustrated in greater detail by FIGS. 6A and 6B. Similarly, although the illustrated radio access node may represent network nodes that include any suitable combination of hardware and/or software, these nodes may, in particular embodiments, represent devices such those illustrated in greater detail by FIGS. 7A, 7B and 8.

Although communication system 100 is depicted as comprising radio access nodes 110, at least some wireless communication devices 105 may be configured to support device-to-device communications, including V2x communications. Thus, radio access nodes 110 may be unused or even omitted in certain preferred embodiments of communication system 100.

Figure 6A:
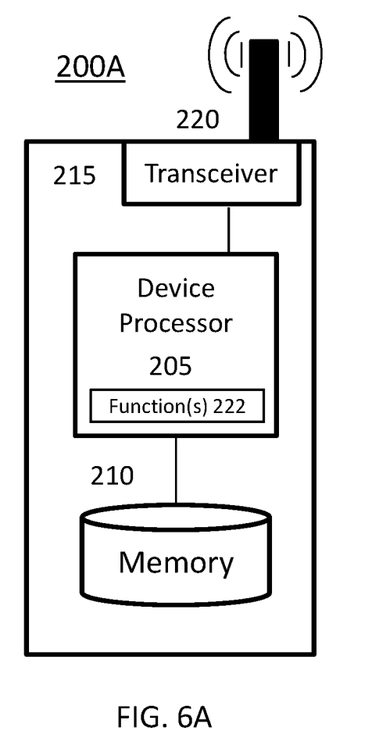
FIG. 6A illustrates a wireless communication device according to an embodiment of the disclosed subject matter.

Referring to FIG. 6A, a wireless communication device 200 A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In certain embodiments, some or all of the functionality described as being provided by UEs, MTC or M2M devices, ITS devices and/or any other types of wireless communication devices may be provided by the device processor executing instructions stored on a computer-readable medium, such as memory 210. Alternative embodiments may include additional components beyond those shown in FIG. 6A that may be responsible for providing certain aspects of the device's functionality, including any of the functionality described herein. Node processor 205 operates to provide at least one function 222 of wireless communication device 200A as described herein. In some embodiments, the function(s) are implemented in software that is stored, e.g., in the memory 210 and executed by node processor 205.

Figure 6B:
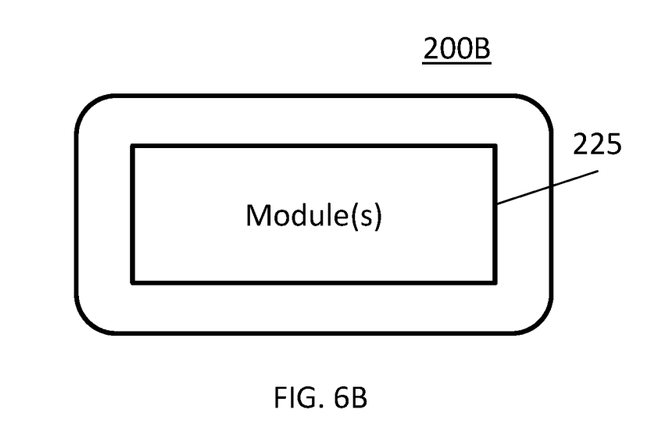
FIG. 6B illustrates a wireless communication device according to another embodiment of the disclosed subject matter.

Referring to FIG. 6B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 6A.

Figure 7A:
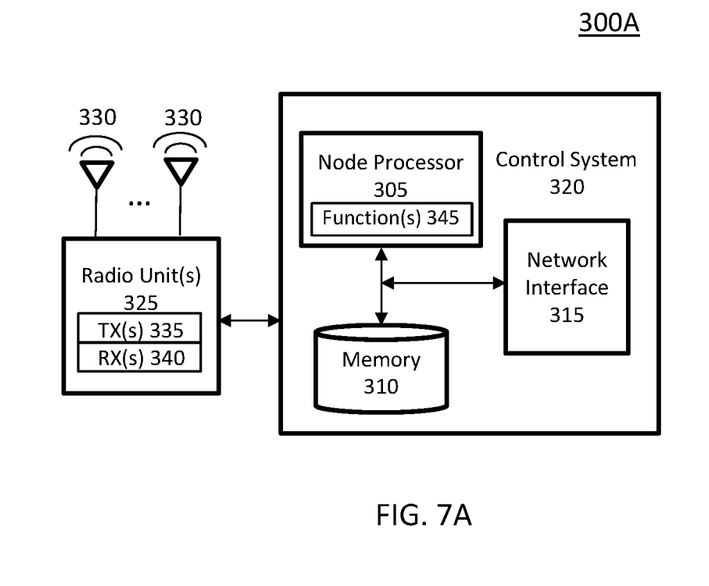
FIG. 7A illustrates a radio access node according to an embodiment of the disclosed subject matter.

Referring to FIG. 7A, a radio access node 300A comprises a control system 320 that comprises a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a node B, an enodeB, and/or any other type of network node may be provided by node processor 305 executing instructions stored on a computer-readable medium, such as memory 310 shown in FIG. 7A. Alternative embodiments of radio access node 300 may comprise additional components to provide additional functionality, such as the functionality described herein and/or related supporting functionality.

Figure 7B:
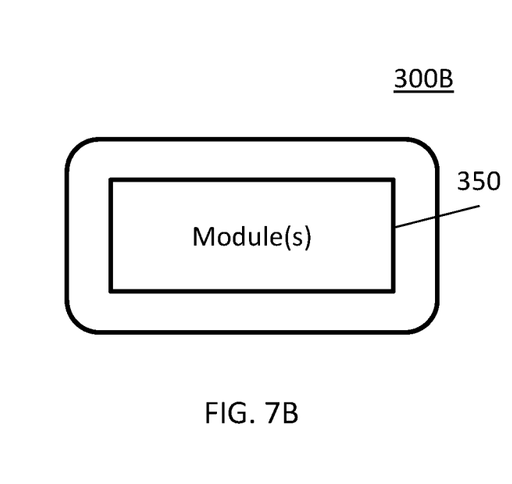
FIG. 7B illustrates a radio access node according to another embodiment of the disclosed subject matter.

Referring to FIG. 7B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 7A.

Figure 8:
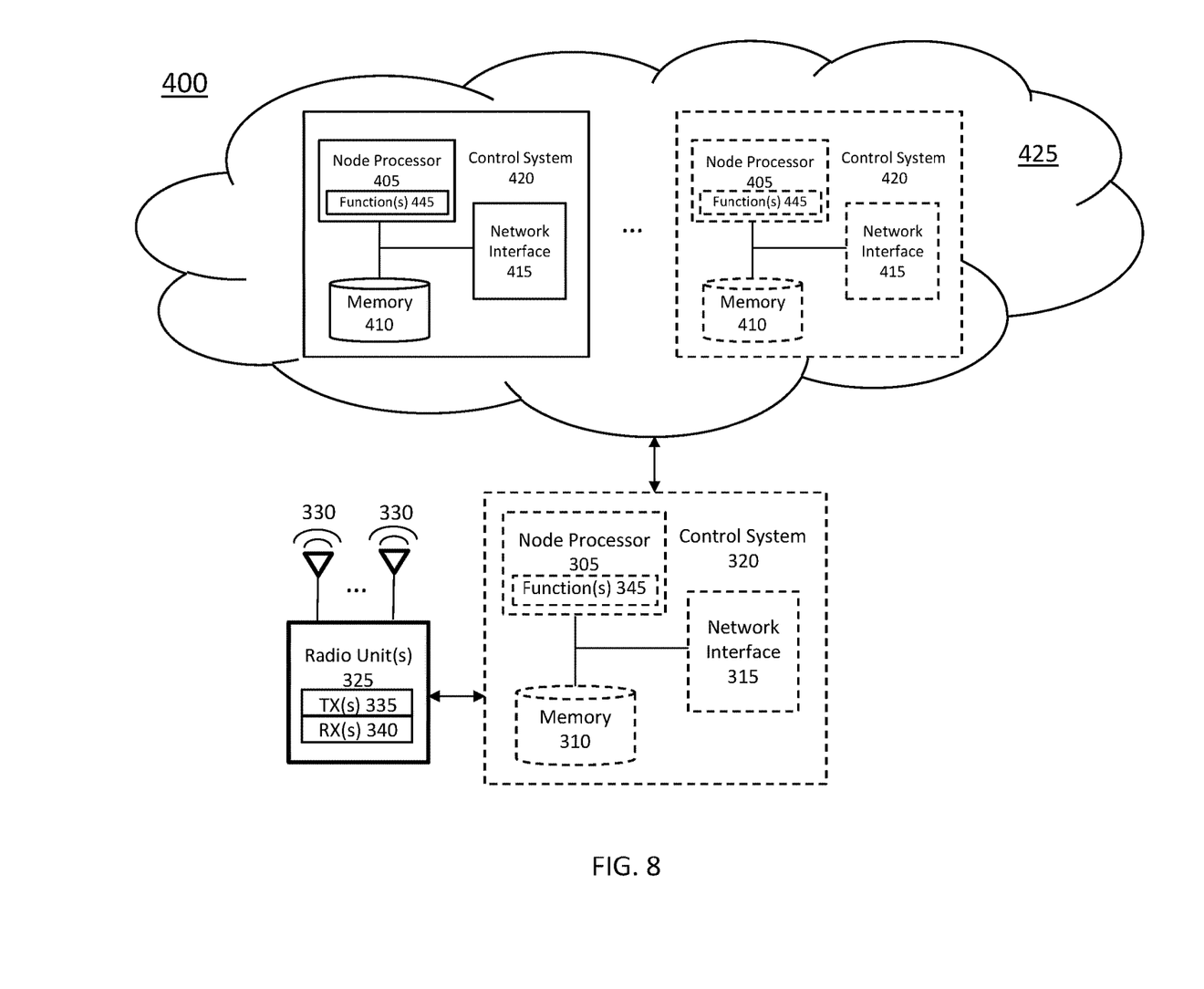
FIG. 8 illustrates a radio access node according to yet another embodiment of the disclosed subject matter.

FIG. 8 is a block diagram that illustrates a virtualized radio access node 400 according to an embodiment of the disclosed subject matter. The concepts described in relation to FIG. 8 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 8, radio access node 400 comprises control system 320 as described in relation to FIG. 7A. Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program comprises instructions which, when executed by at least one processor, causes the at least one processor to carry out the functionality of a wireless communication device (e.g., wireless communication device 105, 200A, or 200B) according to any of the embodiments described herein. Similarly, in some embodiments, a computer program comprises instructions which, when executed by at least one processor, causes the at least one processor to carry out the functionality of a radio access node (e.g., radio access node 110, 300A, or 300B) or another node (e.g., processing node 420) implementing one or more of the functions of the radio access node in a virtual environment according to any of the embodiments described herein.

Figure 9:
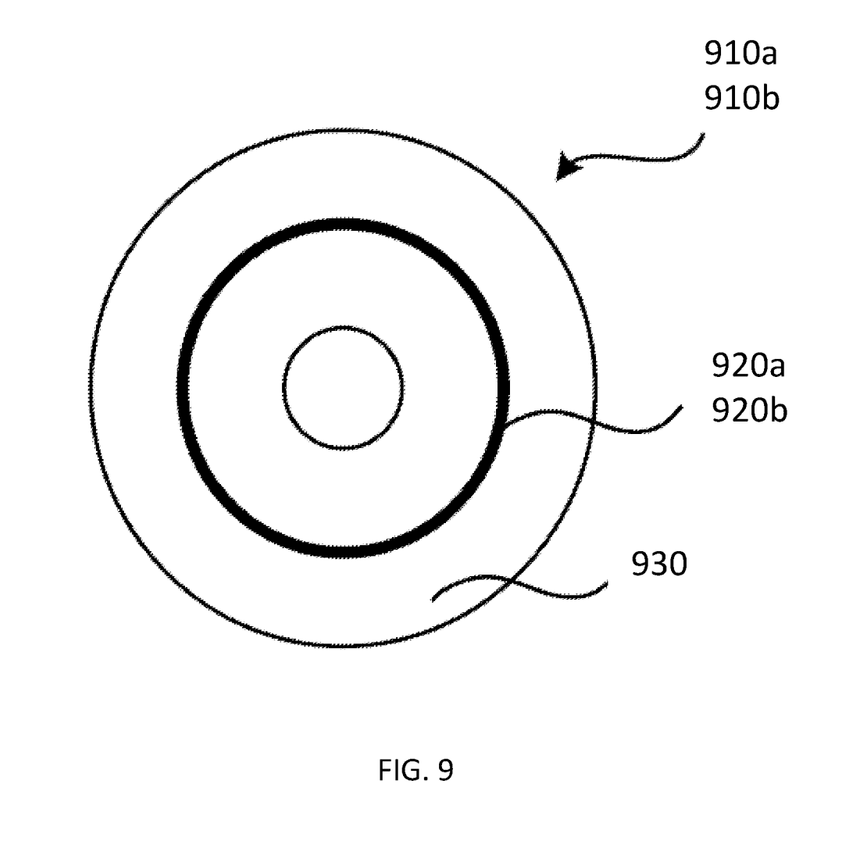
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the RE as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the REC as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

While the disclosed subject matter has been presented above with reference to various embodiments, it will be understood that various changes in form and details may be made to the described embodiments without departing from the overall scope of the disclosed subject matter.

The invention claimed is:

1. A method for sharing a channel in a wireless communications system among wireless devices that use a plurality of different access technologies, the method comprising:
   accessing, by a wireless device, the channel using a first one of the plurality of different access technologies; and
   indicating to one or more other wireless devices that the first access technology is used by the wireless device to access the channel,
   wherein another one of the one or more other wireless devices uses the wireless device's indication that the first access technology is used to access the channel to determine that the channel is semi-statically reserved for the first access technology and to not access the channel using a second access technology.

2. The method of claim 1, wherein the use of the first access technology is indicated to the one or more other wireless devices using a service advertisement signal that is broadcast to advertise use of the channel to the one or more other wireless devices.

3. The method of claim 2, wherein the service advertisement signal is broadcast periodically.

4. The method of claim 2, wherein the use of the first access technology is indicated to the one or more other wireless devices by at least one predetermined signal parameter of the service advertisement signal, the at least one predetermined signal parameter being recognizable by the one or more other wireless devices as indicating use of the first access technology.

5. The method of claim 2, wherein the at least one predetermined signal parameter is at least one of:
   a periodicity of the service advertisement signal; and
   a predetermined sequence used to generate the service advertisement signal.

6. The method of claim 1, wherein the channel is accessed by the wireless devices for one or more Intelligent Transport Systems (ITS) services.

7. The method of claim 1, wherein the plurality of different access technologies includes IEEE-based and 3GPP-based technologies.

8. The method of claim 1, wherein certain services for which the channel is accessed are designated as primary services to be prioritized over certain other services in the network, the method further comprising:
   determining that a service for which the channel is accessed is designated as a primary service,
   wherein indicating to the one or more other wireless devices that the first access technology is used to access the channel includes indicating that the service is designated as a primary service.

9. A method for sharing a channel in a wireless communications system among wireless devices that use different access technologies, the method comprising:
   monitoring, at a first wireless device, a channel for an indication that the channel is accessed by a second wireless device;
   receiving the indication that the channel is accessed by a second wireless device and determining, based on the indication, that the second wireless device is using a first access technology to access the channel, wherein the first wireless device is using a second access technology to attempt to access the channel; and
   at least partially in response to the determination that the second wireless device is using the first access technology, signaling to the second wireless device an instruction to refrain from using the channel to facilitate use of the channel by the first wireless device.

10. A wireless device operable to share a channel in a wireless communications system with one or more other wireless devices that use a plurality of different access technologies, the wireless device comprising:
    at least one transceiver;
    at least one processor; and
    memory comprising instructions executable by the at least one processor whereby the wireless device is operable to:
      access the channel using a first one of the plurality of different access technologies; and
      indicate to one or more other wireless devices that the first access technology is used by the wireless device to access the channel,
      wherein another one of the one or more other wireless devices uses the wireless device's indication that the first access technology is used to access the channel to determine that the channel is semi-statically reserved for the first access technology and to not access the channel using a second access technology.

11. The wireless device of claim 10, wherein the use of the first access technology is indicated to the one or more other wireless devices using a service advertisement signal that is broadcast to advertise use of the channel to the one or more other wireless devices.

12. The wireless device of claim 10, wherein the instructions executable by the at least one processor include instructions whereby the wireless device is further operable to determine that a service for which the channel is accessed is designated as a primary service,
- wherein indicating to the one or more other wireless devices that the first access technology is used to access the channel includes indicating that the service is designated as a primary service, and
- wherein the primary service is prioritized over certain other services in the network.

\* \* \* \* \*